United States Patent
Trim et al.

(10) Patent No.: US 11,799,794 B2
(45) Date of Patent: Oct. 24, 2023

(54) SELECTIVE COMPRESSION OF PACKET PAYLOAD DATA IN A 5G NETWORK

(71) Applicant: INTERNATIONAL BUSINESS MACHINES CORPORATION, Armonk, NY (US)

(72) Inventors: Craig M. Trim, Ventura, CA (US); Faried Abrahams, Laytonsville, MD (US); Gandhi Sivakumar, Bentleigh (AU); Kushal S. Patel, Pune (IN); Sarvesh S. Patel, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/463,446

(22) Filed: Aug. 31, 2021

(65) Prior Publication Data

US 2023/0066251 A1 Mar. 2, 2023

(51) Int. Cl.
*H04L 47/38* (2022.01)
*H04W 28/02* (2009.01)

(52) U.S. Cl.
CPC ......... *H04L 47/38* (2013.01); *H04W 28/0263* (2013.01); *H04W 28/0278* (2013.01); *H04W 28/0289* (2013.01)

(58) Field of Classification Search
CPC ......... H04W 28/0289; H04W 28/0263; H04W 28/0278; H04W 28/06; H04L 47/38; H04L 47/28
See application file for complete search history.

(56) References Cited

U.S. PATENT DOCUMENTS

| | | |
|---|---|---|
| 8,542,136 B1 | 9/2013 | Owsley et al. |
| 9,648,591 B2 | 5/2017 | Rastogi |
| 10,638,353 B2 | 4/2020 | Ahmadzadeh et al. |
| 10,805,832 B2 | 10/2020 | Lee et al. |
| 10,924,825 B2 | 2/2021 | Das et al. |
| 2011/0058474 A1 | 3/2011 | Nagapudi |
| 2012/0246227 A1 | 9/2012 | Vonog et al. |
| 2016/0050653 A1 | 2/2016 | Rastogi |
| 2016/0142518 A1 | 5/2016 | Raina et al. |
| 2017/0163285 A1* | 6/2017 | Nam ................. H03M 7/6082 |
| 2017/0214773 A1* | 7/2017 | Fan ..................... H03M 7/607 |
| 2019/0238661 A1 | 8/2019 | Raina et al. |
| 2019/0253958 A1 | 8/2019 | Lee et al. |
| 2019/0273666 A1 | 9/2019 | Chou et al. |
| 2019/0319858 A1 | 10/2019 | Das et al. |
| 2020/0107220 A1* | 4/2020 | Shreevastav ......... H03M 7/607 |
| 2020/0229206 A1* | 7/2020 | Badic ................... H04W 40/22 |
| 2020/0413288 A1 | 12/2020 | Shi et al. |
| 2021/0021650 A1* | 1/2021 | Hori ....................... H04L 65/70 |
| 2021/0185560 A1 | 6/2021 | Shreevastav |

FOREIGN PATENT DOCUMENTS

| | | |
|---|---|---|
| WO | 2018113589 A1 | 6/2018 |
| WO | 2019156528 A1 | 8/2019 |

OTHER PUBLICATIONS

Jia et al, "An End-to-End IP Header Compressed Packet Forwarding Framework for Bandwidth-Constrained Networks", IEEE (Year: 2017).*
Feres et al, "A Markovian ROHC Control Mechanism Based on Transport Block Link Model in LTE Networks", IEEE (Year: 2018).*
International Search Report and Written Opinion for PCT/EP2022/071110 completed Oct. 26, 2022, 13 pgs.
Mell, Peter, et al., "The NIST Definition of Cloud Computing", NIST Special Publication 800-145, Sep. 2011, Gaithersburg, MD, 7 pgs.
"Uplink Data Compression, 3GPP Solutions for Enhancing the Uplink Performance", MediaTek, Inc., 2018. Retrieved on Aug. 2, 2021 from the Internet URL: <https://d86o2zu8ugzlg.cloudfront.net/mediatek-craft/documents/MediaTek-UDC-White-Paper-PDFUDCWP-0718.pdf>, 21 pgs.
Aijaz, A., "Packet Duplication in Dual Connectivity Enabled 5G Wireless Networks: Overview and Challenges", IEEE Communications Standards Magazine, May 29, 2019. Retrieved on Aug. 2, 2021 from the Internet URL: <https://d86o2zu8ugzlg.cloudfront.net/mediatek-craft/documents/MediaTek-UDC-White-Paper-PDFUDCWP-0718.pdf>, 9 pgs.
"Optimizing Network Applications for 5G"—Ericsson, Apr. 21, 2017. Retrieved on Aug. 2, 2021 from the Internet URL: <https://www.ericsson.com/en/news/2017/4/optimizing-network-applications-for-5g>, 3 pgs.
Collela, P., "5G and IoT: Ushering in a New Era". Retrieved on Aug. 2, 2021 from the Internet URL: <https://www.ericsson.com/en/about-us/company-facts/ericsson-worldwide/india/authored-articles/5g-and-iot-ushering-in-a-new-era>, 12 pgs.

(Continued)

*Primary Examiner* — Omer S Mian
(74) *Attorney, Agent, or Firm* — Rakesh Roy; Matthew M. Hulihan; Heslin Rothenberg Farley & Mesiti PC

(57) ABSTRACT

Selective compression of packet payload data in a 5G network includes receiving a congestion signal by user equipment (UE) connected to a broadband cellular network based on network traffic congestion in hardware of the network and indicating the network traffic congestion, determining current processor utilization of the UE, based on the received congestion signal, the determined current processor utilization, and known times for data compression and decompression, determining whether to automatically enable selective packet payload data compression on the UE, and based on determining to automatically enable selective packet payload data compression, compressing payload data of data packet(s) generated by the UE, and forwarding the data packet(s) with the compressed payload data for transmission on the broadband cellular network.

20 Claims, 12 Drawing Sheets

(56) References Cited

OTHER PUBLICATIONS

"LTE eNB Architecture", Artiza Networks. Retrieved on Aug. 2, 2021 from the Internet URL: <https://www.artizanetworks.com/resources/tutorials/arc.html>, 5 pgs.

Jung, K., "Optimizing Media and Radio Signal Processing for 5G", Mar. 20, 2018. Retrieved on Aug. 2, 2021 from the Internet URL: <https://www.3gpp.org/news-events/1950-sa4>, 2 pgs.

Office Action in Taiwanese Application No. 111126222, completed Mar. 1, 2023, 20 pgs.

Office Action in Taiwanese Application No. 111126222, dated Aug. 23, 2023, 8 pgs.

* cited by examiner

SELECTIVE COMPRESSION OF PACKET PAYLOAD DATA IN A 5G NETWORK

BACKGROUND

Advancements in the telecommunication industry have been a key enabler of the success of many on-demand and web-provided technologies like Artificial Intelligence (AI) processing due to improvements in bandwidth and other factors. 5G technology, referring to fifth generation technology standards for broadband cellular networks, is expected to push dependent technologies even further via higher bandwidth (e.g., 1 gigabit per second), convergence of Internet-of-Things (IoT) device access, and other advancements.

SUMMARY

Shortcomings of the prior art are overcome and additional advantages are provided through the provision of a computer-implemented method. The method wirelessly receives a congestion signal by user equipment (UE) wirelessly connected to a broadband cellular network. The congestion signal is received based on network traffic congestion in hardware of the broadband cellular network and indicating the network traffic congestion. The method determines current processor utilization of the UE. The method then, based on the received congestion signal, the determined current processor utilization, and known times for data compression and decompression, determines whether to automatically enable selective packet payload data compression on the UE. Based on determining to automatically enable selective packet payload data compression, the method compresses payload data of data packet(s) generated by the UE and forwards the data packet(s) with the compressed payload data for transmission on the broadband cellular network.

Further, a computer system is provided that includes a memory and a processor in communication with the memory, wherein the computer system is configured to perform a method. The method wirelessly receives a congestion signal by user equipment (UE) wirelessly connected to a broadband cellular network. The congestion signal is received based on network traffic congestion in hardware of the broadband cellular network and indicating the network traffic congestion. The method determines current processor utilization of the UE. The method then, based on the received congestion signal, the determined current processor utilization, and known times for data compression and decompression, determines whether to automatically enable selective packet payload data compression on the UE. Based on determining to automatically enable selective packet payload data compression, the method compresses payload data of data packet(s) generated by the UE and forwards the data packet(s) with the compressed payload data for transmission on the broadband cellular network.

Yet further, a computer program product including a computer readable storage medium readable by a processing circuit and storing instructions for execution by the processing circuit is provided for performing a method. The method wirelessly receives a congestion signal by user equipment (UE) wirelessly connected to a broadband cellular network. The congestion signal is received based on network traffic congestion in hardware of the broadband cellular network and indicating the network traffic congestion. The method determines current processor utilization of the UE. The method then, based on the received congestion signal, the determined current processor utilization, and known times for data compression and decompression, determines whether to automatically enable selective packet payload data compression on the UE. Based on determining to automatically enable selective packet payload data compression, the method compresses payload data of data packet(s) generated by the UE and forwards the data packet(s) with the compressed payload data for transmission on the broadband cellular network.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
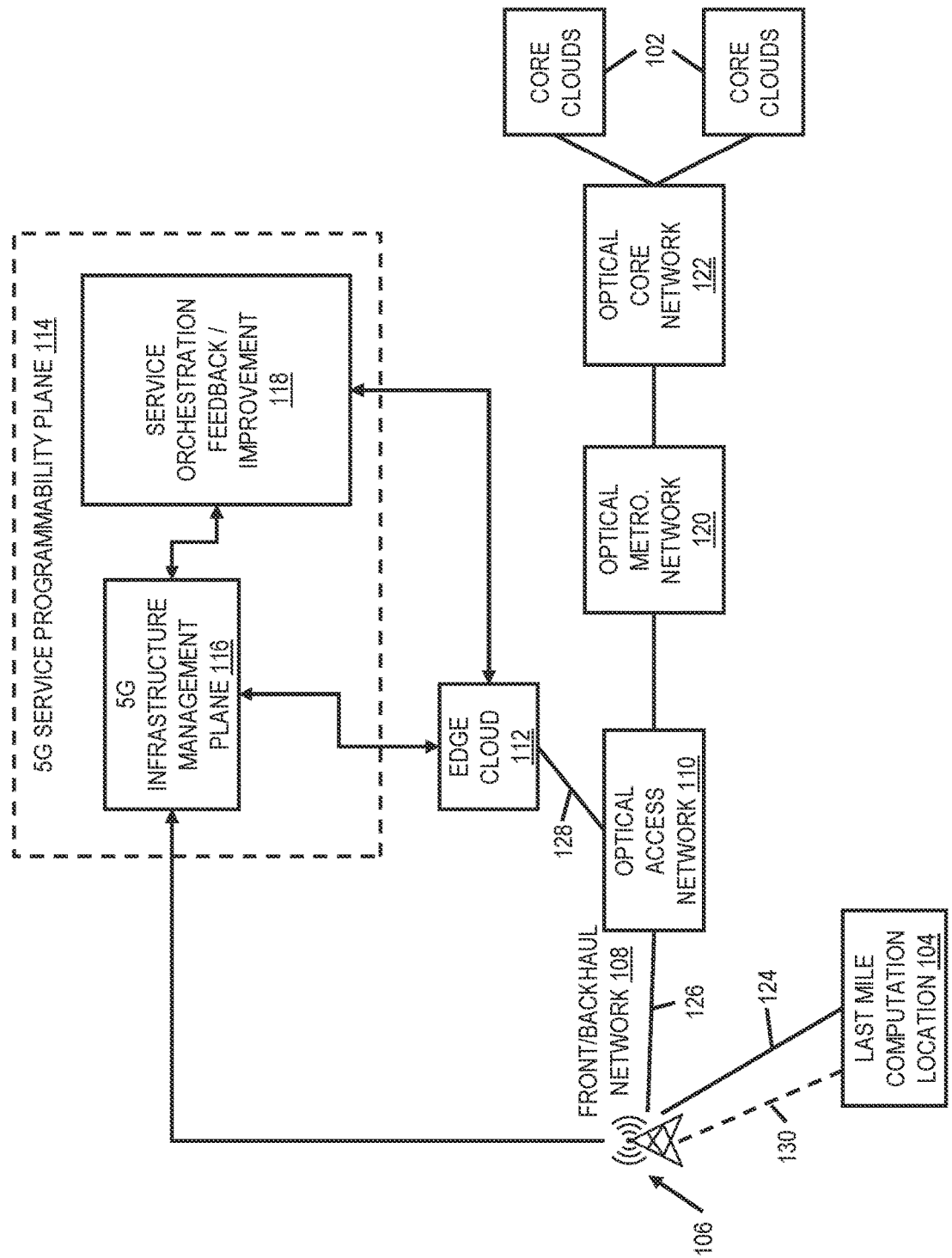
FIG. 1 depicts an example conceptual diagram of data transmission over a 5G broadband cellular network.

Described herein are approaches for selective compression of data packet payloads in telecommunications networks, for instance 5G broadband cellular networks. FIG. 1 depicts an example high-level conceptual diagram of data transmission over a 5G broadband cellular network and components residing between communicating endpoints, such as a client/user device and a target cloud endpoint of a core cloud. Referring to FIG. 1, core clouds 102 are cloud environments with which user equipment (UE) endpoints (e.g., cellular-based endpoints, such as smartphones, not depicted) interact. Typically, this interaction is to access services provided by computing devices of the core clouds, for instance data-related services and/or cellular phone call services, as examples.

A UE is a user wireless device present in a location referred to as the 'last mile' (104). 'Last mile' is a term referring to the links between UEs and a core network of a telecommunications provider. In 5G telecommunications technology, 'last mile' typically encompasses the hardware and software facilitating radio communication between UEs and individual base stations/radio endpoints (106). These devices communicate via a Front/Backhaul Network 108 with an optical access network 110 providing connectivity to other networks, for instance an edge cloud network 112 for 5G management and other services. System(s) of edge cloud 112 provide a 5G service and programmability plane 114 having an infrastructure management plane 116 working in close concert with service orchestration 118 to orchestrate 5G connectivity services being provided to the UEs.

Optical access network 110 provides connectivity and access to the core clouds 102 via, in this example, an optical metropolitan network 120 that communicates with an optical core network 122 to the core clouds 102. Links/lines between components/networks represent wired/wireless communications paths for communicating data and may encompass additional/other intervening systems/networks. 5G related data transmission occurs between the UEs and the edge cloud 112 over links 124, 126, 128. Control commands 130 can additionally be communicated between the radio endpoints 106 and the connected UEs.

Figure 2:
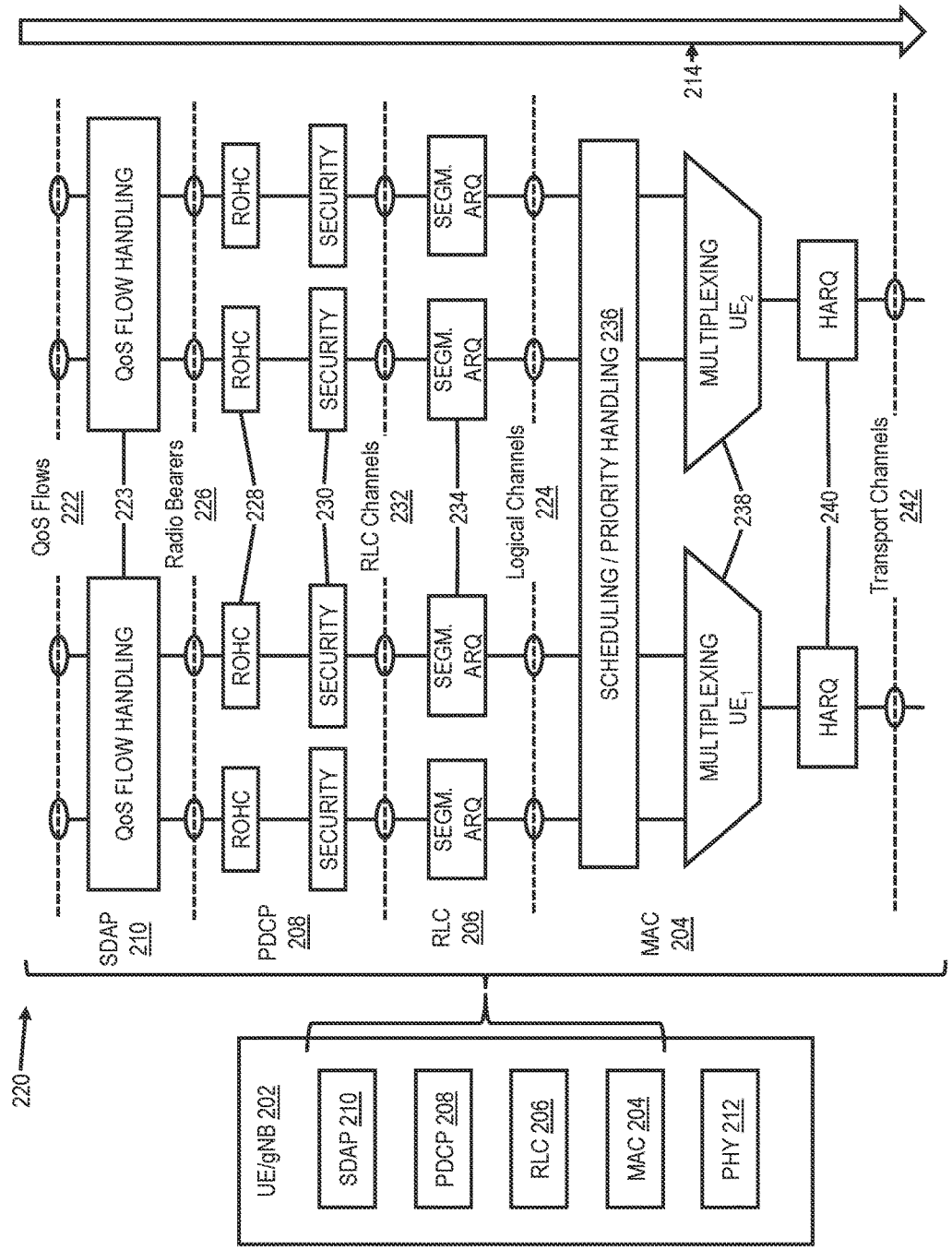
FIG. 2 depicts components of the 5G User Plane protocol stack.

5G telecommunications technology, also referred to herein as 5G, "5G NR", "New Radio", or just "NR", refers to fifth-generation radio access technology overseen by the 3rd Generation Partnership Project (3GPP). FIG. 2 depicts aspects of the 5G User Plane protocol stack, both at a high-level view (as stack 202) and a more detailed view 220. A Medium Access Control (MAC) Layer 204 of NR provides services to the Radio Link Control (RLC) Layer 206 in the form of logical channels 224. These logical channels are virtualized communication network interfaces that are used to transfer Input/Output (IO) commands (e.g., network data packets) and control instructions over radio interfaces and 5G fixed access networks. A logical channel is defined by the type of information it carries and is generally differentiated as either (i) a control channel used for transmission of control and configuration information or (ii) a traffic/transport channel used for transmission of user data. 5G NR technology enables creation of multiple logical channels over a single radio bearer network using 5G network slicing models. The logical channels are used to carry specialized traffic from a UE device to the 5G network. As multiple channels are created from a single device to the 5G network, these channels deliver parallelism in packet transmission that reduces exclusive locking of 5G network resources and hence provides performance benefits.

In particular, downlink packet flow 214 for two UEs (UR1, UEn) through the user plane stack 202/220 of the UE devices proceeds through Quality-of-Service (QoS) flows 222 into QoS flow handling components 223 in the Service Data Adaptation Protocol (SDAP) layer 210. The packets enter the Packet Data Convergence Protocol (PDCP) layer 208 via radio bearers 226 for Robust Header Compression (ROHC) 228 and security processing 230 (such as encryption). The packets are then forwarded via RLC channels 232 for segmentation automatic repeat request (ARQ) 234 in RLC layer 206. The packets are transmitted over logical channels 224 into the MAC layer 204 for scheduling/priority handling 236. The MAC layer multiplexes 238 packets going to the respective UEs for Hybrid Automatic Repeat Request (HARQ) 240 error control/correction, then onto transport channels 242 down to the physical layer 212, referring to the physical device hardware for transmission on the network.

The PDCP layer traditionally performs header compression, ciphering, and other data convergence activity, such as packet alignment for packet transmission on the physical infrastructure. Typical PDCP processing compresses packet headers of 5G data packets but not the packet payload, i.e., payload data of the packets. However, there is a capability for payload compression of 5G data packets. In such implementations, PDCP has a compression mechanism that captures data packets from upper layer protocol(s) (such as SDAP in the UE stack) and compresses the entire packet using an existing compression technique/algorithm, such as Huffman coding or LZ77, before sending the packet over the Radio Link interface. Because the complete payload is compressed (potentially in addition to the separate, optional ROHC compression), the load of RLC, MAC and PHY radio link layer traffic is reduced and could provide better congestion control in NR technology. Further, this helps improve the capacity of the Radio interfaces and provides benefits to NR multiplexing.

A payload compression mechanism can be injected into the PDCP of 5G UE to collect the incoming packets and perform data (packet payload) compression and convergence on each packet coming from the upper layer(s) of the system. Advancements in next-generation telecommunications networks and application software allow for increasing numbers of dedicated logical channels from the application layer to the E-UTRAN Node B devices (also known as "Evolved Node B", "eNodeB" and "eNB" devices) that are used to transmit the data over cellular network interfaces. An E-UTRAN Node B device is referred to as an "eNodeB". In the context of 5G technology, the eNodeB is sometimes referred to as a "5G Evolved Node B", "5G eNodeB", "gNodeB", "next-generation eNodeB", "NG eNB" or "5G eNB" device to transmit data over NR. Sometimes the nomenclature is simplified to use "eNodeB" to encompass any of the foregoing devices, i.e., devices with capabilities of traditional 3G, 4G/LTE, and/or 5G technologies, and references to eNodeB herein are to encompass 5G Evolved Node B devices.

In these implementations, all of the application channels transmit packets to PDCP, and the lower protocols subsequently handling the packets transfer the data to the destination over the radio links. When the data is submitted to the PDCP layer, PDCP handles alignment and data convergence before forwarding it to RLC controls. With the enablement of software-defined network slicing models in 5G, the User Plane protocols need optimization to adopt software definition controls of logical channels (Dedicated Traffic Channel—"DTCH") with consideration for situations of NR congestion.

The introduction of PDCP processing to incorporate packet payload data (and ROHC header) compression in NR creates latency and is not suitable to use in some circumstances because the compression algorithms are time and space complex. This is one of the reasons why many applications and logical channels have not adopted PDCP-based payload compression as a default for UE devices. When PDCP is used for payload/full packet compression, the time required for that compression (and subsequent decompression at a receiving device) can contribute to significant Radio and network latency. It is not practical for every mobile application to use full payload data compression to reduce the network workload. Because of this, applications typically favor transmission of non-compressed packets over the Radio link (that further translates to the S1 bearer), which contributes to increased data transmission over the Radio. 5G is expected to serve real-time data transmission for speed-sensitive applications like augmented reality and many other data-intensive applications, in which Radio Link data transmission will be a relatively massive haul.

During times of peak network access, the Radio link of NR technology may experience network congestion due to of unavailability of packet data transmission slots in Radio link multiplexing. The NR logical channels, called dedicated traffic channels (DTCHs) share the available Radio link resources using multiplexing. The provisioning of requisite virtual infrastructures (VIs) on the eNodeBs and UEs to support end user devices commonly requires direct hardware element support or its emulation via software for multiplexing traffic over the shared infrastructure. Hence, the radio link can become congested during peak times with many users accessing the same set of resources. One common scenario is when many additional users start connecting to an eNodeB and initiate the creation of DTCHs. The Physical Network Function (PNF), i.e., the function implemented by software on dedicated PNF hardware element(s), responsible for control of the eNodeB can become bottlenecked.

Figure 3:
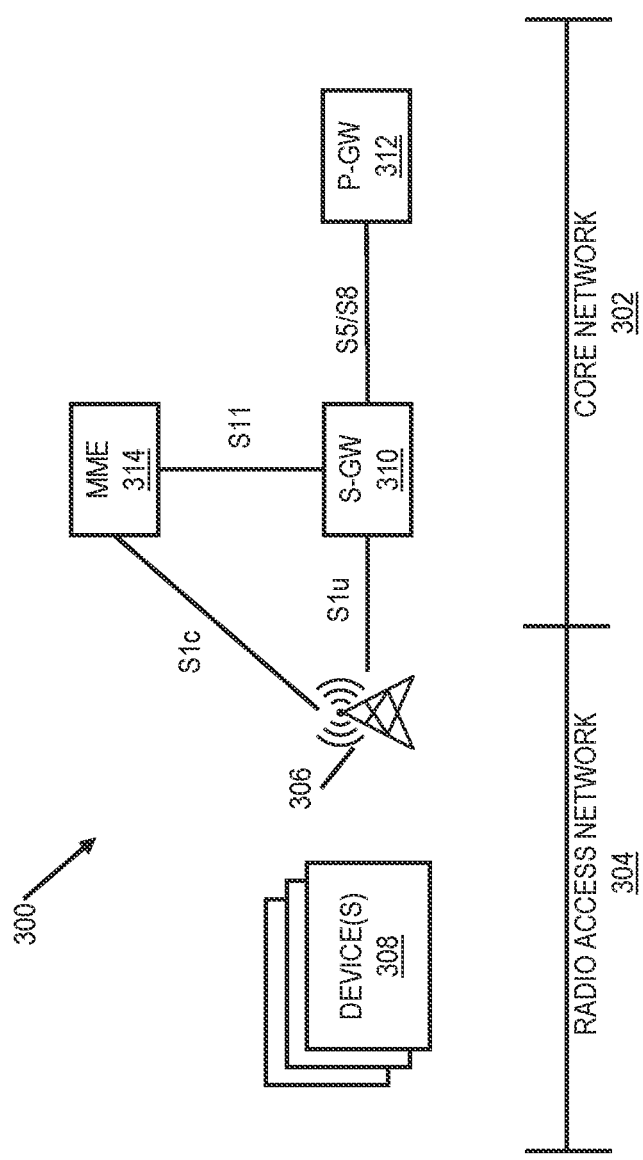
FIG. 3 depicts an example conceptual diagram of congestion in a 5G broadband cellular network.

FIG. 3 depicts an example conceptual diagram of congestion in a 5G broadband cellular network. The 5G network 300 includes a core network portion 302, also referred to as a "fixed access network" (FAN), and a radio access network (RAN) portion 304 that includes eNodeB 306 and UEs 308. In practical applications, the 5G network would include multiple eNodeBs and respective UEs connected to each such eNodeB. UEs are mobile devices or any wireless devices connecting to the 5G cellular network. The UEs 308 communicate with eNodeB 306 over the RAN using the established RAN protocol. The eNodeB 306 translates RAN traffic to FAN traffic (such as that of Public Switched Telephone Network—PSTN). The channels between the RAN and the FAN are referred to as the S1 bearer links/channels. One such channel is S1u to the Serving Gateway (S-GW) 310 for communication over S5/S8 link to the Packet Data Network Gateway (P-GW 312) and core cloud (not pictured). Another such channel is S1c to the Mobility Management Entity (MME) 314, which also connects to S-GW 310 over an S11 link.

While FIG. 3 shows only a single eNodeB of the RAN, there are usually multiple eNodeBs each having respective communication paths to the backend components, i.e., of core network 302.

PNF bottleneck situations can occur at the eNodeB 306, S-GW 310, MME 314, and/or P-GW 312, as examples. Applications leveraging 5G connectivity will start experiencing delays in packet transmission and behave unexpectedly as a result, hampering real-time usability thereof. While there are Quality-of-Service Class Identifier (QCI) mechanisms in place for tagged DTCHs and this can help Radio Division Scheduling, in some cases congestion is beyond the capabilities of a conventional QCI handler. This will result in packet drop/loss and degraded user experiences in applications affected, and potentially even application crash.

Current approaches fail to provide a way to handle these situations, including by way of compression decisions based on available computational bandwidth of 'last mile' devices (e.g., UEs) and interaction with the PDCP layer for selective payload compression of packets for transmission over NR DTCH pathways. Since payload compression adds additional latency to data transmission speeds because of the complexity of compression algorithms, it is desired to provide selectivity in data compression enablement. Such selectively can be based on actual or predicted PNF/Radio link congestion and delivery statistics as described herein. Under conventional approaches when congestion of the radio link and/or PNF occurs, there is no way to leverage UE resources (if available) to minimize Radio link traffic (which translates to reduction in PNF processing) and reduce radio resource congestion. Further, there is no way for selectivity in which PDCP channels to compress, for instance based on QCI values and application packet tagging, in order to reduce the impact of additional compression/decompression processing and provide better performance in situations of 5G cellular network congestion.

Accordingly, aspects described herein provide approaches working in the 5G User Plane protocol stack for communicating with the DTCH controller and PDCP layer of the User Plane protocol stack for addressing radio resource congestion at the eNodeB or PNF level of 5G Fixed Access Networks by providing intelligent and selective data packet payload compression in the PDCP layer. Specifically, packet compression is selectively triggered and performed prior to data convergence for sending packets over the physical link from a UE into the 5G network. This offers an optimized way for selective packet payload compression, optionally also in conjunction with ROHC and PDCP ciphering, for traffic of designated UE applications relying on 5G connectivity. Some aspects provide selective payload compression at the UE instances and communication of compressed packets to a 5G eNodeB/PNF device for packet decompression, thereby providing RAN traffic and congestion mitigation (reduction), for instance during times of DTCH overburden ('DTCH storms'). Additional aspects provide observation of existing packet delay and permissible packet latencies, in conjunction with computational processing delay based on QCI indexing and application mappers to facilitate determination of when to selectively activate PDCP processing to perform the data packet payload compression. This helps reduce RAN congestion in a 5G network and additionally saves on reserved infrastructure cost to handle RAN and PNF congestion in the 5G network.

The selective compression applies to packets flowing between UE and eNodeB devices. It encompasses, in some embodiments, compression of packets from the UE for uplink to eNodeB/radio access network endpoints, as well as, in other embodiments, compression of packets from RAN endpoints (e.g., PNF devices or eNodeBs) for downlink to UEs, as examples. It is also noted that the selective compression of packet payload data can refer to compressing an entire data packet or portion(s) thereof that include the payload data of the data packet.

One aspect includes a software instance executing in the PNF (e.g., on hardware providing some PNF) of the 5G stack. The instance monitors for resource utilization and traffic congestion at an eNodeB and optionally other components of the link to the core network (e.g., sitting in front of the S-GW, MME, including the S1 bearer channel), such components implementing PNFs. One or more eNodeBs might be congested and/or a PNF device itself might be overloaded, as examples. More generally, resource utilization and congestion levels in terms of network traffic routing can be assessed for any component of the RAN. In this regard, resource monitoring tools and a notification component can be deployed to physical components (eNodeBs and PNF devices for instance) to detect resource consumption and potential traffic congestion. The monitoring tools can notify a PNF instance executing on a physical device (eNodeB or otherwise) in cases that congestion reaches/surpasses configurable thresholds. If a RAN radio link (over-the-air) resource component is overloaded/congested, a congestion signal is generated, for instance by the software instance of the PNF executing in an eNodeB or elsewhere and provided to downstream components such as the UEs connected to the eNodeB(s) controlled by the PNF. This signals the UEs of the potential to enable selective packet compression thereon. In addition, the eNodeB can use that determination to identify for itself also that selective packet compression may potentially be implemented to compress packets flowing down to the UEs, for instance if the UEs indicate that added workload from compression/decompression activity thereon can be tolerated.

The PNF can formulate a congestion signal and provide it as a command in a Broadcast Control Channel (BCCH) frame to eNodeB(s) for sending from the eNodeB(s) over the Radio Link interface to connected UEs. The congestion signal can be provided as a broadcast frame, e.g., received by all 5G enabled devices in communication with the eNodeB(s) at that time. A software instance executing on the client/UE device uses this as a network congestion hinting signal from the 5G upper layer stack to determine whether to automatically enable selective packet payload data compression on the UE.

The client instance monitors for a BCCH event indicative of radio link/PNF congestion. Once a BCCH event is received with the congestion signal indicating the congestion, aspects can monitor packet latency experienced over NR and monitor resource utilization of the UE to decide whether or not packet compression is worth implementing, i.e., whether the additional computational processing, e.g., to compress outgoing packet payload data, will result in a net reduction in the detected congestion. This can be dependent on a packet delay budget referring to what level of latency the affected endpoint applications can tolerate. If an application can tolerate up to 20 milliseconds (ms) of delay, PDCP processing needs 10 ms to compress and decompress a packet of application data, and network latency is 5 milliseconds, then overall processing delay is 10 ms compression time+5 ms network latency+10 ms decompression time=25 ms, which exceeds the 20 ms packet delay budget and therefore compression is not a viable option.

Additionally, if packet transmission latency (congested traffic latency) is 20 ms, PDCP processing needs 10 ms to compress, and network latency is 5 ms if compression is enabled (i.e., due to reduced congestion), then in this case overall processing delay will again be 25 ms, which is greater than the congested traffic latency of 20 ms. There would be no benefit to the additional PDCP processing to compress/decompress in this case. If, however, compression/decompression results in reduced congestion such that the overall latency to compress/decompress is lower than the current congested traffic latency, then it may be desired to compress the packets in that situation until congestion is sufficiently reduced. Eventually, it is expected that compression/decompression would begin adding to the overall latency of packet transmission if congestion is low enough or non-existent. Thus, based on these anticipated latency insights, the decision of whether to undertake additional PDCP processing for compression/decompression is instructed accordingly.

Based on the raising and provision of a congestion signal, decisions can be made as to whether to apply packet payload data compression. One factor in whether to actually compress packet payload data in a situation of network congestion is current CPU utilization/consumption of the involved endpoints/nodes. Thus, current CPU consumption of the UE can be determined and used to make decisions as to whether to undertake PDCP payload data compression. In situations where CPU utilization is below some threshold limit (which could be a user-configured threshold or one set based on a requirement of PDCP processing), then aspects can enable the additional PDCP processing to compress packet payload data in an attempt to reduce network congestion. In situations where CPU utilization is above the threshold, such that the added CPU resource to compress packet payload data could lead to overutilization of the processing resources, then a decision can be made to refrain from payload compression.

If selective compression is enabled, then all packets or just some packets to be sent by the UE can be compressed. Which packets to compress could be a function of the logical channels (DTCHs) on which to transfer the packets. In an embodiment that enables compression on a per-logical channel (DTCH) basis, a process collects a list of established DTCHs between an eNodeB the UE, as well as the respective QCI values of those DTCHs. This is undertaken to understand channel characteristics across channels. The QCI values are categories based on guaranteed bitrate (GBR) and Non-GBR modes, and further by an associated packet delay budget of the DTCH. The DTCHs having more packet delay budget (PDB) and optionally more packet error loss rates are identified to determine the DTCHs that are mapped to low budget applications. Typically, these DTCHs are mapped to applications that afford data loss and delayed packet delivery over the network. As an example, a QCI of 66 indicates GBR for Non-Mission-Critical user plane Push to Talk voice traffic, while a QCI of 75 indicates GBR for V2X traffic. Non-GBR traffic uses other dedicated QCI indices. This information can be supplied to a PDCP data convergence layer by way of protocol frame transmission for packet payload compression by a PDCP component.

Accordingly, when selective compression is enabled then whether received payload data is to be compressed can be a function of the DTCH on which to transmit the packet data. In this regard, whether to compress a given packet can be a decision per logical channel (e.g., Channel ID for each packet). If compression is to be performed for packets on a given channel, then the packets on that channel from the SDAP layer are compressed.

Selective compression can remain enabled until a compression disablement signal is generated/received (e.g., by/from the eNodeB) to indicate that selective compression is to be disabled. This is raised in some example when it has been determined that the threshold level of network congestion (that triggered selective compression) has been resolved.

When a packet enters the PDCP layer from an upper level layer of the 5G user plane protocol stack, additional PDCP congestion control information can be traced by a PDCP payload compression module. In case selective compression is enabled for the DTCH/data stream pertaining to the packet, then software of the PDCP layer performs payload compression and sends the packet to the RLC layer for transmission over the Radio Link. This may be done at a UE endpoint for transmission to an eNodeB, for instance.

The compression status of a packet (i.e., by way of a compression status indicator indicating if/whether the packet payload is compressed) can be pinned to the packet during transit. The indicator can then be checked by any one or more components/devices, for instance by a device that is responsible for decompressing packet payload data. The indicator could be checked by a virtual network function (VNF) at an eNodeB or S-GW, for instance, that is responsible for decompressing the packet payload data.

Furthermore, in cases where selective compression is enabled and performed but CPU utilization rises beyond the threshold, an OS or other component of the UE that learns of the over-threshold utilization can raise a stop signal to a process/service of the UE and/or eNodeB to halt additional compression processing and thereby prevent any further increase in CPU utilization on account of compression/decompression activity. Similarly, if CPU utilization is already above the threshold when a congestion signal is received by a UE from an eNodeB, the UE could automatically determine not to take action in terms of enabling payload data compression and optionally respond back that the UE is unable to selectively compress packets on account of high CPU utilization. As yet another example, CPU utilization of the UE could be provided by the UE to an eNodeB or other controlling entity, and that entity could determine whether the additional processing to compress payload data of outgoing packets or decompress payload data of received packets should be imposed on the UE device.

When the congestion that gave rise to a congestion signal reduces to below some threshold such that the selective compression is to be disabled, then a PNF instance can send a BCCH frame to the eNodeB/UEs to notify that the radio line congestion condition has been resolved. A receiving UE can decode the frame, see the indicator of congestion resolution, and revert to normal operation mode in which packet payload data is not compressed. It is noted compression of payload data/an entire packet generally in accordance with the selective compression discussed herein may be independent of any packet header compression performed by the PDCP layer; headers may optionally be compressed per conventional PDCP header compression practice regardless of whether the selective packet payload data compression is enabled or disabled.

Available CPU resource can thereby be leveraged to aid in reducing radio link congestion at the eNodeBs, for instance when an expected or actual spike in user access in detected in a region. Further, a process can selectively apply compression to packets only if it is determined that it will result in an improvement in latency to the application layers of UE devices. As QCI can be validated before taking a decision to compress a given packet, the selective compression can be applied to those packets for which transmission delay can be tolerated with an acceptable level of application impact, and can be avoided for other packets. In some examples, selective compression to relieve network congestion can be activated to handle bursts in UE connection activity by eNodeB and PNF devices in a 5G network, thereby reducing costs for additional infrastructure buffers.

Aspects discussed herein address Radio link congestion of NR technology with intelligent packet data processing, and reduce infrastructure and hardware cost for buffer resource pools at eNodeBs by using available computational bandwidth at the 'last mile' UEs to handle radio link congestion over multiplexing channels. Aspects intelligently select the packets to compress so that the impact of the additional PDCP processing to compress packet payload data does not exceed the tolerance of affected applications. This improves on PDCP compression approaches for effective utilization of mobile resources. Aspects also provide better application-to-network packet transmission latency, leading to better user experiences in situations of 5G resource congestion.

Figure 4:
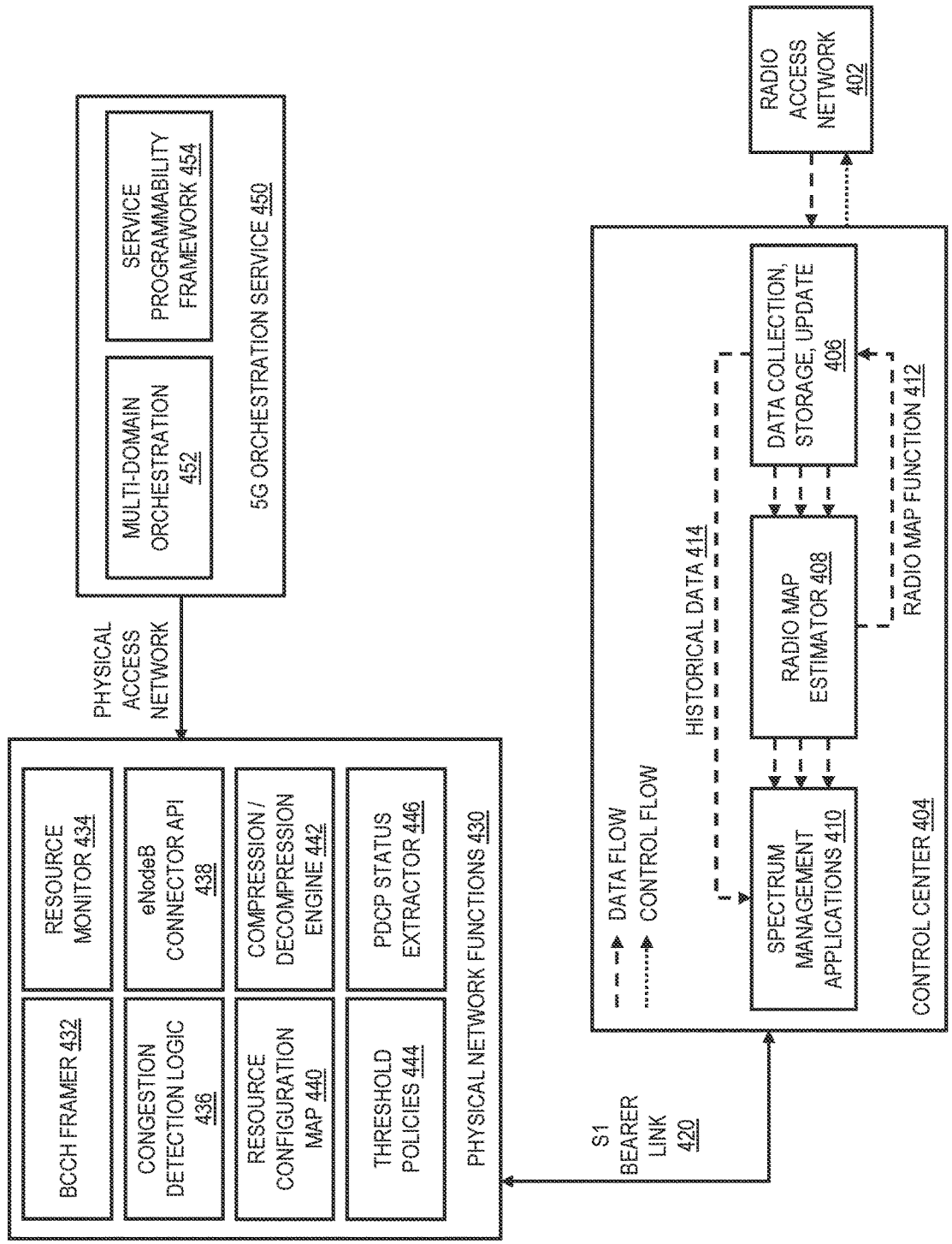
FIG. 4 depicts a conceptual representation of physical network functions to incorporate and use aspects described herein.

FIG. 4 depicts a conceptual representation of physical network functions to incorporate and use aspects described herein. 5G radio link architecture encompasses physical network functions (PNFs) and virtual network functions (VNFs), with a PNF comprising hardware infrastructure controlling multiple base transceiver station(s)/eNodeB(s).

In FIG. 4, the radio access network 402 includes, as examples, client UEs, dedicated and non-dedicated sensing devices, and differing types of base stations in communication with each other and that communicate with a controlling entity (control center 404) via data flow (comprising power measurements for instance) toward control center 404. The control center 404 includes components for data collection, storage, and update (406), radio map estimation 408 to provide radio map function 412 to component 406, and spectrum management 410, with data flow communication therebetween. Additionally, the control center 400 communicates back to the RAN 402 devices with control flow, for instance proactive wireless resource allocation, spectrum surveillance, and other controls, which can be received by base stations for propagating control flow to individual devices.

The control center 404 is connected via an S1 bearer link on the physical access network to the PNF 430. The physical access network also includes 5G orchestration service 450 providing multi-domain orchestration 452 and a service programmability framework 454, in communication with the PNF 430. PNF 430 includes a BCCH framer 432 for generating and forwarding frames, such as those discussed herein for signaling congestion to UEs, resource monitor 434 for monitoring resources of network equipment and receiving indications of utilization/overutilization of network equipment, such as eNodeBs, PNFs, and bearer links, congestion detection logic 436 for determining when there is network congestion, an eNodeB connector API 438 for communicating/calling to eNodeBs, a resource configuration map 440 with an inventory and configuration information of network resources, including indications of which devices access which eNodeBs, compression and decompression engine 442 for compressing/decompressing packets in accordance with aspects described herein, threshold policies 444 for identifying network congestion situations and triggering congestion signals, and a PDCP status extractor 446 for decoding a current level of PDCP based data and payload compression settings.

If congestion is present with respect to only one or more (but not all) eNodeBs controlled by a given PNF, then the congestion signal can be propagated via those congested eNodeB(s) to those UEs of the congested eNodeBs. The UEs of those eNodeBs can determine whether to enable selective compression for packets flowing from those UEs to one or more eNodeBs.

If the congestion issue is present with the PNF itself, this affects all eNodeBs handled by that PNF, in which can the congestion signal can be sent to all of those eNodeBs. Selective compression could be potentially enabled for all of the packets flowing to/from all such eNodeBs. In this regard, where congestion is present informs the paths that carry packets potentially subjected to selective compression.

Historical data 414 can be used to identify timelines of congestion and potentially identify patterns/features that can predict when congestion is likely to occur. Timeframes predicted to experience congestion can inform times to proactively send a congestion signal to enable selective packet compression/decompression at UEs, even before the congestion is realized. In this regard, selective compression could be triggered automatically and proactively to address predicted congestion that is predicted based on historical trends. Additionally/alternatively, as explained above, the selective compression could be enabled based on actual congestion that is observed/detected in real-time.

An example flow at a PNF function in accordance with aspects described herein is as follows: Initially, resource monitoring is initiated with the Physical Network Function (PNF) of a 5G stack to monitor resources, such as eNodeBs, PNFs, and other resources before the S-GW, for overload situations. A notification generator can also be deployed to the resources to provide a vehicle to notify a PNF of a congestion. The flow polls for eNodeB, S1 bearer link, and PNF resource utilization and checks whether utilization of any is above configurable threshold(s). If so, the flow identifies a type of resource congestion (for instance PNF or eNodeB) from the resource mapper (FIG. 4 #440). The PNF generates a congestion signal command over a BCCH frame. The BCCH framer (FIG. 4 #432) generates the message for the eNodeBs and radio access network. The BCCH framer sends a STRUCT FRAME to the PNF, which receives the frame using BCCH controller APIs. A broadcast frame is sent to the 5G enabled devices in communication with the eNodeBs over the radio access network multiplexing framework. Software on the client devices (UEs) uses this as a network congestion hinting signal from the 5G upper layer stack. The flow then returns to re-poll for resource utilization to determine whether congestion is still present. Once congestion drops below to below the applicable threshold(s), then selective compression can be disabled via a similar process but to indicate via a compression disablement signal that the network congestion is no longer present.

Figure 5:
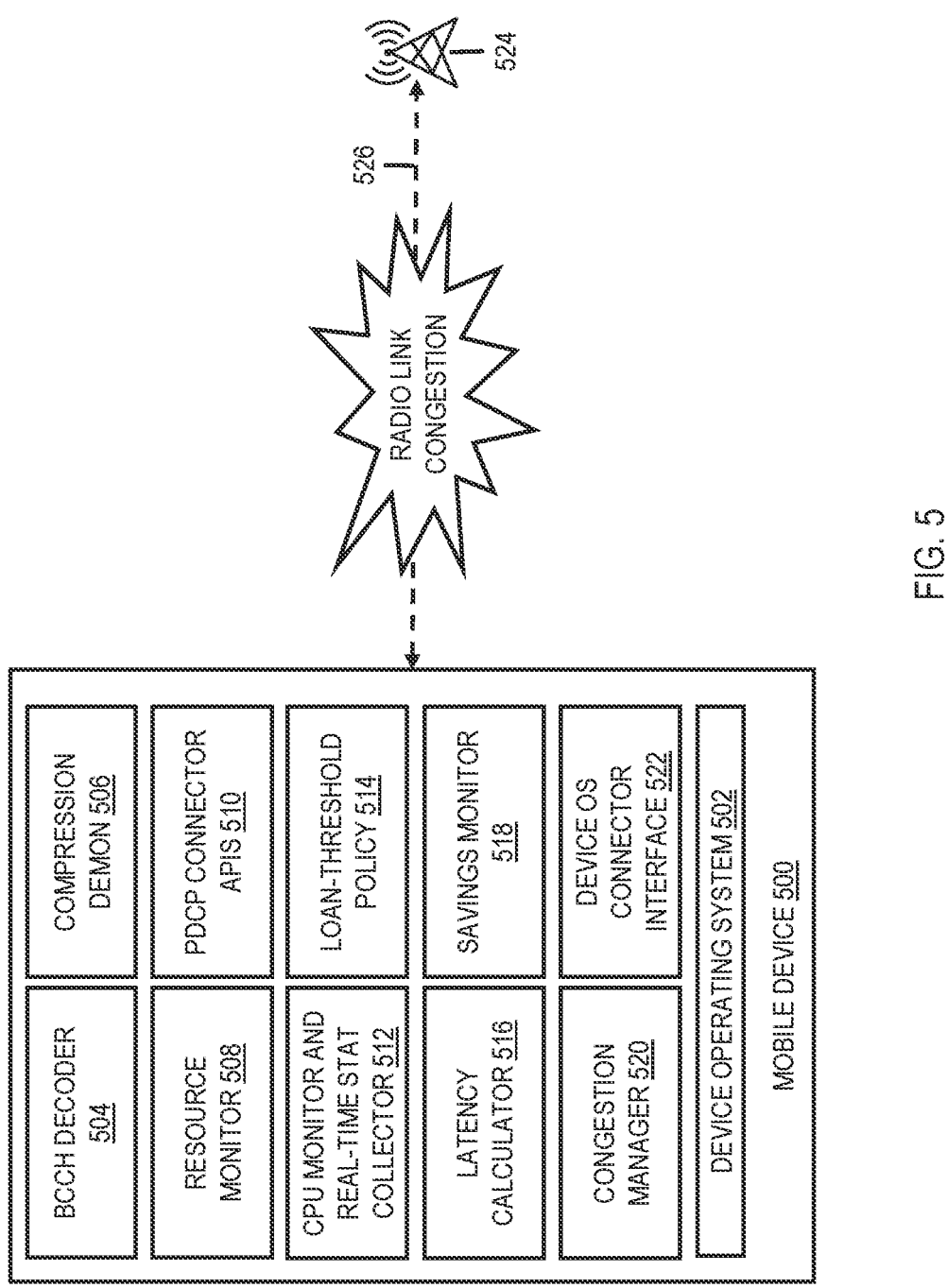
FIG. 5 depicts a conceptual representation of a mobile device (UE) to incorporate and use aspects described herein.

FIG. 5 depicts a conceptual representation of a mobile device (e.g., UE) to incorporate and use aspects described herein. The UE 500 executes an operating system (OS) 502 above which applications execute. The UE 500 includes a BCCH decoder 504 for decoding received frames, such as frames that provide congestion signals for network congestion (i.e., to potentially enable selective compression of packet payload data) and/or to disable selective compression. The UE 500 also includes compression demon 506 to perform packet payload data/full packet compression, resource monitor 508 to monitor resources of the UE 500, PDCP connector APIs 510 for communicating/calling to the PDCP layer, CPU monitor and real-time statistics collector 512 (a specialized form of resource monitor 508), loan-threshold policy 514, latency calculator 516, savings monitor 518, congestion monitor 520 for detecting congestion in the RAN connection 526 to an eNodeB 524, and device OS connector interface(s) 522. Loan-threshold policy 514 indicates a limit of the local CPU beyond which the mobile device CPU can be used for compression and decompression activity. The limits can be collected as defined, user-configurable inputs. The latency calculator 516 is a latency management process that calculates packet transmission latency and round trip time for packets. The savings monitor 518 is a process that calculates transmission time savings based on overall round trip time and the compression latency requirements of the device. Congestion monitor 520 detects congestion in the 5G network, and the device OS connector interface(s) 522 are lower-level application programming interface(s) to inquire about CPU, memory, and other system resources.

An example flow at a UE device in accordance with aspects described herein is a follows: Client/UE software polls for a BCCH event with the congestion signal indicating radio link/PNF congestion. When a BCCH event is received, the flow extracts the opcode of the function and if it indicates the congestion signal, then the flow monitors for packet latency experienced over the NR connection. If the packet transmission delay is less than the processing timelines to compress the packet and decompress the packet, then selective compression is not invoked. Otherwise, if this overall processing delay is less than the existing delay, then an appropriate message is sent to PDCP and the flow obtains CPU utilization (e.g. by sending a message to the platform message queue), reads a CPU utilization threshold value from a config file or STRUCT CONFIG MAP (e.g., a configuration map loaded when starting the process; this can have all of the desired user-defined values like CPU thresholds, etc.), the value indicating a threshold under which CPU core utilization must be in order to invoke selective compression, and compares current CPU utilization to the threshold. If current CPU consumption is less than the threshold value, then selective PDCP payload data compression is enabled, otherwise it is not enabled. The flow initiates collection of established logical channels (COLLECT_DTCH) and associated QCI values, classifies the GBR and non-GBR modes of QCI values, and identifies packet delay budgets for the various channels. The logical channels having more packet delay budget and optionally more packet error loss are identified to determine the DTCHs mapped to low budget applications. This information is sent to the PDCP data convergence layer so that when data is received at the PDCP layer, the channel ID for that data is identified and, if compression is enabled for that channel ID, PDCP packet payload data compression is applied and the data packet with the applied compression is sent to the RLC layer for transmission over the Radio Link. Compression status can also be pinned to the packet for extraction by downstream component(s) to know when to decompress packet data. If at any point CPU utilization exceeds the utilization threshold for selective compression enablement, then the UE OS sends a signal to disable selective compression in order to save CPU workload of the UE. Additionally, the PNF could send a BCCH frame to notify the UE when the congestion is resolved and in order to disable the selective compression and resume normal operation of the UE which does not compress packet payload data.

Figure 6:
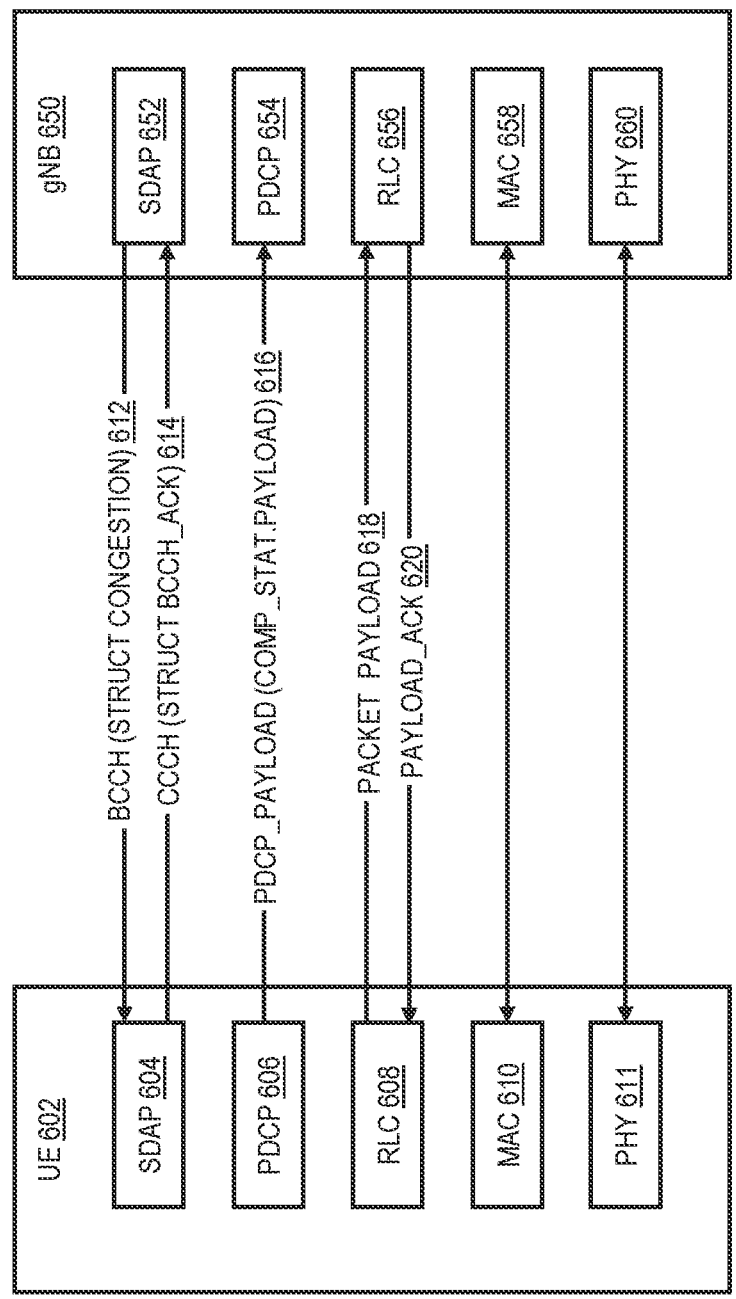
FIG. 6 depicts radio communication messages between 5G User Plane protocol stacks at a user endpoint and a base station device, in accordance with aspects described herein.

FIG. 6 depicts radio communication messages between 5G User Plane protocol stacks at a UE 602 and gNodeB 650, in accordance with aspects described herein. Based on detecting congestion, the SDAP layer 652 of gNodeB 650 sends to the SDAP layer 604 of UE 602 a congestion signal 612 indicating congestion. SDAP layer 604 returns an acknowledgement 614 of receiving the congestion message. PDCP layer 606 of UE 602 communicates 616 compressed payload data with compression status indicators to the PDCP layer 654 of gNodeB 650. RLC layer 608 of UE 602 sends a packet payload message 618 to RLC layer 656 of gNodeB 650, which acknowledges receipt by sending back an acknowledgement message 620. MAC layers 610/658 can exchange MAC-based VNF commands and the physical layer 611/660 is for sending/receiving packets on physical links.

Figure 7:
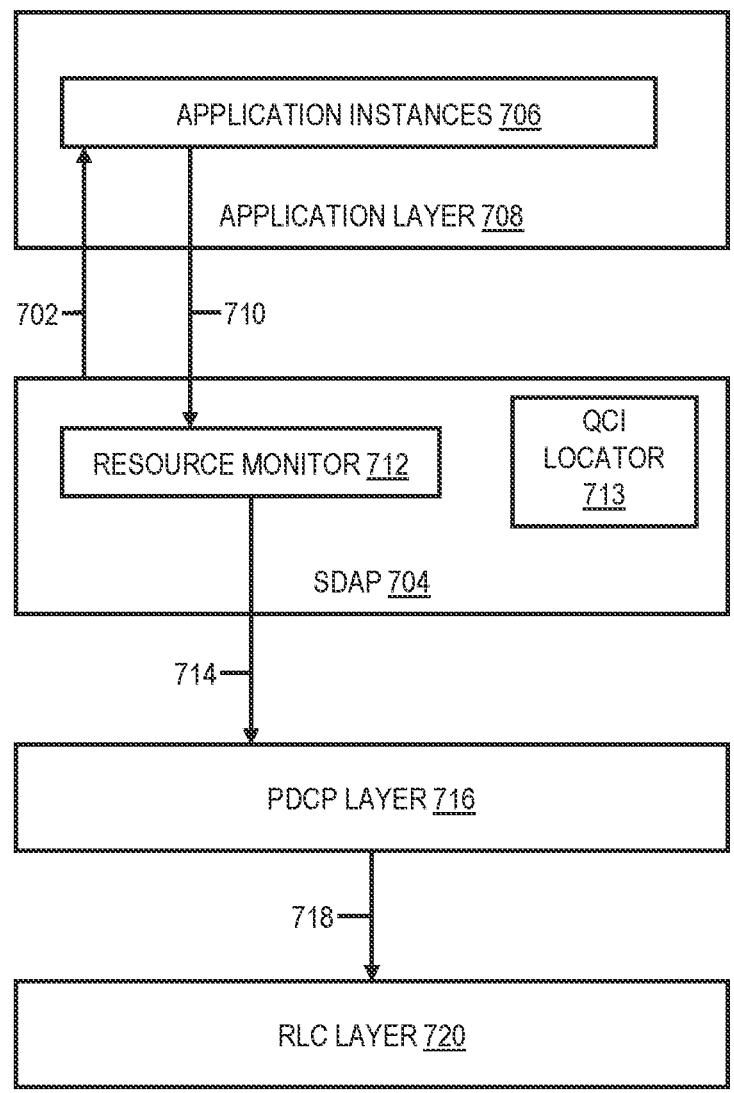
FIG. 7 depicts communication in the User Plane protocol stack of a User Endpoint device, in accordance with aspects described herein.

FIG. 7 depicts communication in the User Plane protocol stack of a UE device, in accordance with aspects described herein. Application instances 706 of the application layer 708 communicate STRUCT_TYPE message(s) 710 to a resource monitor of the SDAP layer 704, the struct type indicating what type of packets (e.g., compressed payload or non-compressed payload) are being transferred. The resource monitor 712 determines whether selective compression is enabled and sends compression_enable (packet/DTCH_ID) message 714 to the PDCP layer 716 indicating packets/logical channel IDs for compression. The resource monitor can leverage the QCI locator 713 in determining whether particular logical channels on which to pass payload data are enabled for selective payload data compression.

Meanwhile, compression type message(s) 702 is/are provided by SDAP 704 to application instances to indicate a compression type applied, if applicable. PDCP layer 716 provides compressed payload data (STRUCT COMP) 718 to RLC layer 720 for sending converged packets onto the 5G network via the physical hardware.

Figure 8A:
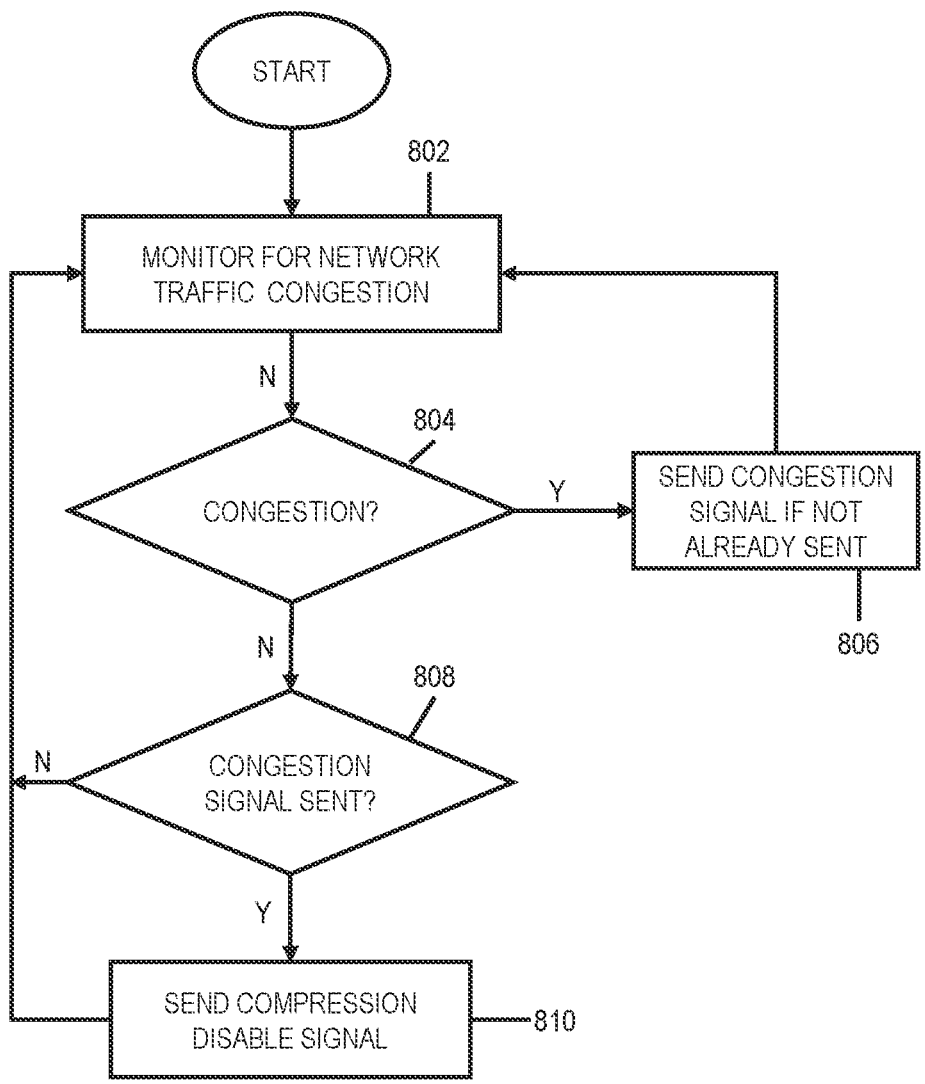
FIGS. 8A-8B. depict example processes for selective packet payload data compression, in accordance with aspects described herein.
Figure 8B:
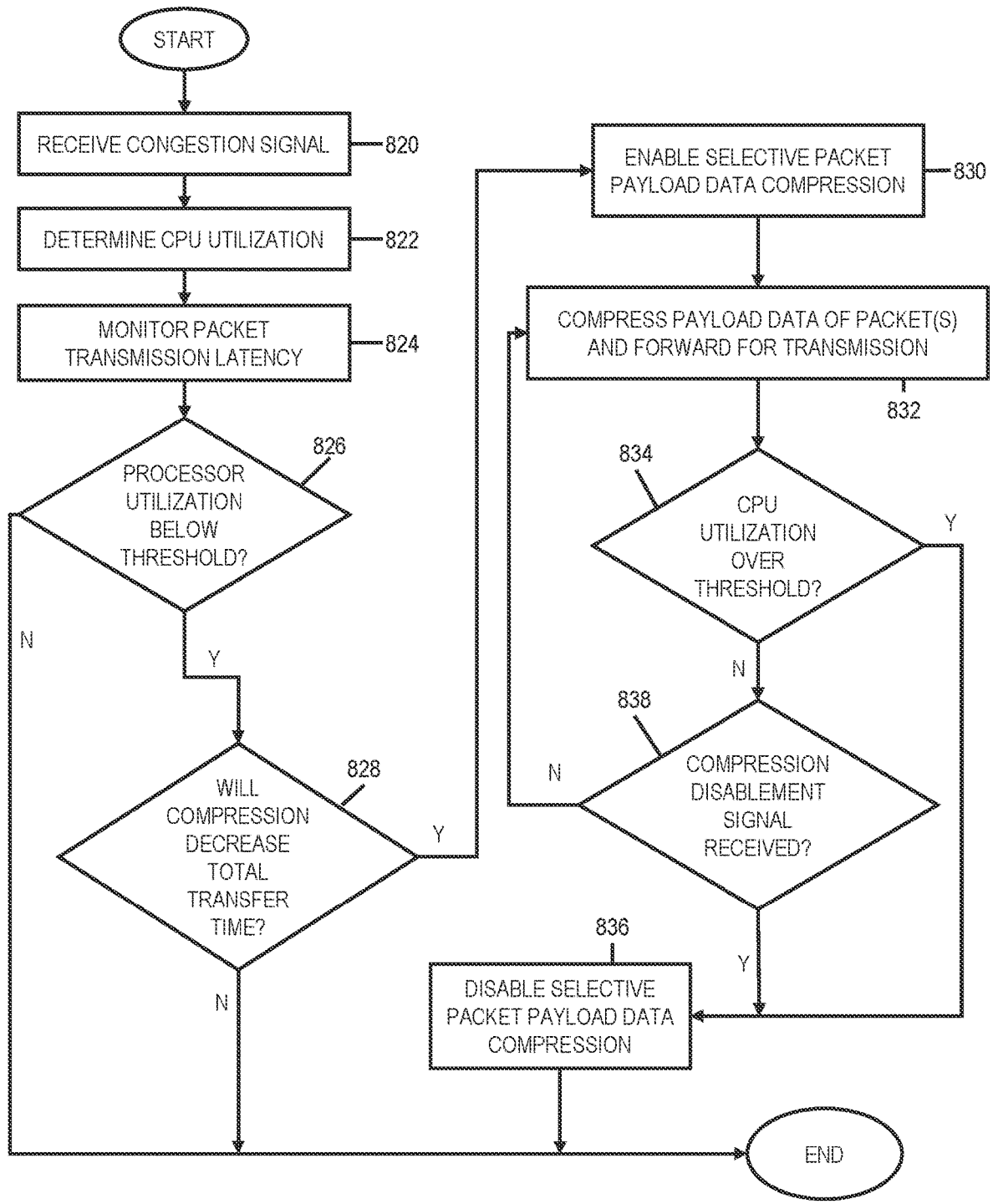

FIGS. 8A-8B depict example processes for selective packet payload data compression in accordance with aspects described herein. Aspects of the process are performed by processing/computer systems, such as those that include or are incorporated into UEs, eNodeBs, PNF devices, and/or one or more other computer systems. Example process FIG. 8A involves aspects performed by a PNF device.

Referring to FIG. 8A, the process monitors (802) for network traffic congestion of a radio link of a broadband cellular network, the congestion of the radio link being congestion of a radio base station (such as a gNodeB/eNodeB device) and/or a PNF device (either the PNF performing the process of FIG. 8A of another PNF) of the broadband cellular network. The broadband cellular network is a 5G New Radio network, for instance. In some examples, this monitoring 802 is performed by resource monitoring and altering the PNF on resource overload. The process determines (804) whether congestion is observed, and, if so, (804, Y), sends (806) congestion signal(s) to one or more UE devices, for instance sends them as a BCCH broadcast frame, if congestion signals had not already been sent informing of this congestion. Each UE is in direct wireless communication with a radio base station (such as an eNodeB) of the broadband cellular network. After 806, the process returns to 802 to further monitor for traffic congestion.

If instead at 804 congestion is not observed (804, N), then the process determines (808) whether a congestion signal was previously sent to indicate a congestion situation that was not known to have cleared until just determining (804, N) that it cleared. If not (808, N), then the network remains uncongested and the process returns to 802. Otherwise, (808, Y), then a congestion signal was previously sent to indicate congestion but now the network has recovered and is uncongested. The process therefore proceeds to send (810) a compression disable signal to the UEs and then returns to 802 to repeat.

Process FIG. 8B depicts aspects performed by a UE in accordance with aspects described herein. The process begins with a trigger from receiving a congestion signal from a PNF device (per FIG. 8A, 806), as an example. The UE is wirelessly connected to a broadband cellular network, for instance a 5G network.

The process wirelessly receives (820) the congestion signal based on network traffic congestion in hardware (such as an eNodeB and/or PNF device) of the broadband cellular network, which indicates the network traffic congestion. The process determines (822) current processor utilization of the UE and monitors (824) packet transmission latency over a wireless radio link between the UE and the broadband cellular network. At this point, having received the congestion signal, determined current processor utilization, and knowing times it takes for data compression (e.g., at the UE) and decompression (e.g., at receiving network devices) to be performed, the process determines whether to automatically enable selective packet payload data compression on the UE. Thus, the process compares current CPU utilization to a utilization threshold set for the UE to determine (826) whether the utilization is below the threshold. If not (826, N), then the process ends. Otherwise, (826, Y) the process proceeds by determining (828) whether, in comparison to the packet transmission latency, selective packet payload data compression will result in a net decrease in time to transfer the payload data over the broadband cellular network. As an example, based on a sum of (i) a known time to compress the payload data, (ii) a known time to decompress the payload data, and (iii) a known time to transmit the payload data if compressed being less than the packet transmission latency, inquiry 828 determines that selective packet payload data compression will result in a net decrease in time to transfer the payload data over the broadband cellular network.

If inquiry 828 is answered in the negative (828, N), the process ends. Otherwise (828, Y), the process determines to automatically enable selective packet payload data compression and does so (830). Based on determining to automatically enable selective packet payload data compression, the process compresses (832) payload data of one or more data packets generated by the UE and forwards the one or more data packets with the compressed payload data for transmission on the broadband cellular network. In embodiments, the compressing is performed in a packet data convergence protocol (PDCP) layer of a User Plane stack of the UE. The PDCP layer can be configured to perform compression of header data of the one or more packets regardless of whether the selective packet payload data compression is enabled or disabled. In addition, the process can, as part of the compressing the packet payload data, pin a compression status indicator to each of the one or more data packets that indicates to other devices of the broadband cellular network that the payload of the data packet is compressed.

Optionally, whether to actually compress payload data when selective compression is enabled can be a function of the particular dedicated logical channel involved. For instance, the one or more packets are for transmission on a particular dedicated logical channel that the UE has established with the broadband cellular network and that is associated with a quality-of-service class identifier (QCI). The process in this example can optionally check whether compression is enabled for that dedicated logical channel, which can be based on the QCI associated with the dedicated logical channel. The compressing (832) can be performed based on such a check indicating that compression is enabled for that dedicated logical channel. If not enabled for that channel, the process could end (or continue processing more incoming payload data for selective compression).

The compression of payload data continues, though there are periodic or aperiodic checks as to whether this should continue. For instance, the process determines (834) whether CPU utilization has increased to surpass the utilization threshold. If so (834, Y), the process disables (836) selective packet payload data compression on the UE and ends. If instead CPU utilization did not surpass the threshold (843, N), the process determines (838) whether a compression disablement signal has been received from the PNF device. If not (838, N), the process returns to 832 to continue with payload data compression as applicable. Otherwise, the disablement signal has been received (838, Y), the process disables (836) selective packet payload data compression on the UE, and then the process ends.

Although various examples are provided, variations are possible without departing from a spirit of the claimed aspects.

Figure 9:
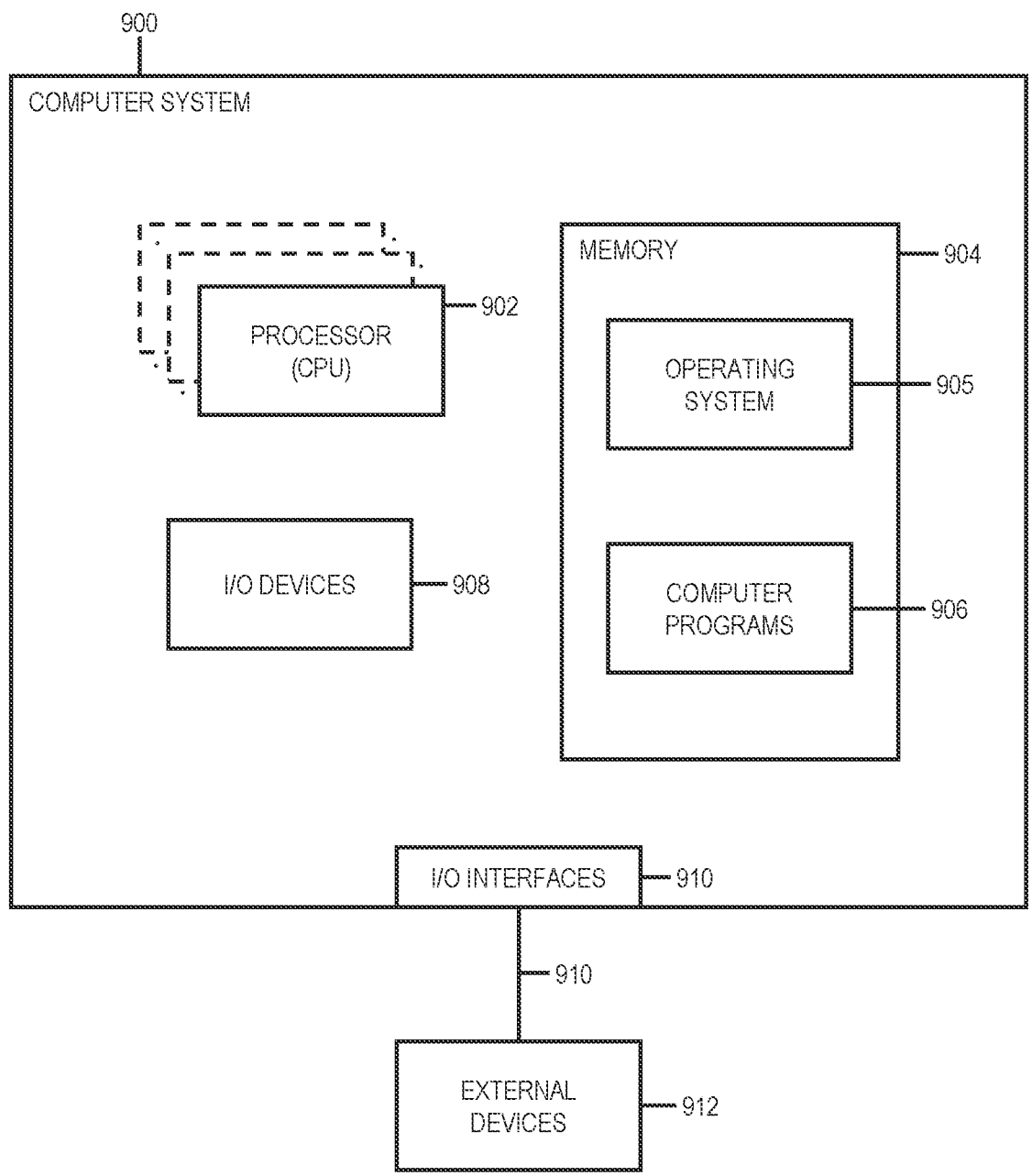
FIG. 9 depicts one example of a computer system and associated devices to incorporate and/or use aspects described herein.

Processes described herein may be performed singly or collectively by one or more computer systems. Such computer systems may be, or be incorporated into, one or more devices of a telecommunications network, such as one or more PNF devices, gNodeB devices and/or UE devices, as examples. FIG. 9 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 9 shows a computer system 900 in communication with external device(s) 912. Computer system 900 includes one or more processor(s) 902, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 902 can also include register(s) to be used by one or more of the functional components. Computer system 900 also includes memory 904, input/output (I/O) devices 908, and I/O interfaces 910, which may be coupled to processor(s) 902 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 904 can be or include main or system memory (e.g., Random Access Memory) used in the execution of program instructions, storage device(s) such as hard drive(s), flash media, or optical media as examples, and/or cache memory, as examples. Memory 904 can include, for instance, a cache, such as a shared cache, which may be coupled to local caches (examples include L1 cache, L2 cache, etc.) of processor(s) 902. Additionally, memory 904 may be or include at least one computer program product having a set (e.g., at least one) of program modules, instructions, code or the like that is/are configured to carry out functions of embodiments described herein when executed by one or more processors.

Memory 904 can store an operating system 905 and other computer programs 906, such as one or more computer programs/applications that execute to perform aspects described herein. Specifically, programs/applications can include computer readable program instructions that may be configured to carry out functions of embodiments of aspects described herein.

Examples of I/O devices 908 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (912) coupled to the computer system through one or more I/O interfaces 910.

Computer system 900 may communicate with one or more external devices 912 via one or more I/O interfaces 910. Example external devices include a keyboard, a pointing device, a display, and/or any other devices that enable a user to interact with computer system 900. Other example external devices include any device that enables computer system 900 to communicate with one or more other computing systems or peripheral devices such as a printer. A network interface/adapter is an example I/O interface that enables computer system 900 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 910 and external devices 912 can occur across wired and/or wireless communications link(s) 911, such as Ethernet-based wired or wireless connections. Example wireless connections include cellular, Wi-Fi, Bluetooth®, proximity-based, near-field, or other types of wireless connections. More generally, communications link(s) 911 may be any appropriate wireless and/or wired communication link(s) for communicating data.

Particular external device(s) 912 may include one or more data storage devices, which may store one or more programs, one or more computer readable program instructions, and/or data, etc. Computer system 900 may include and/or be coupled to and in communication with (e.g., as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 900 may be operational with numerous other general purpose or special purpose computing system environments or configurations. Computer system 900 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
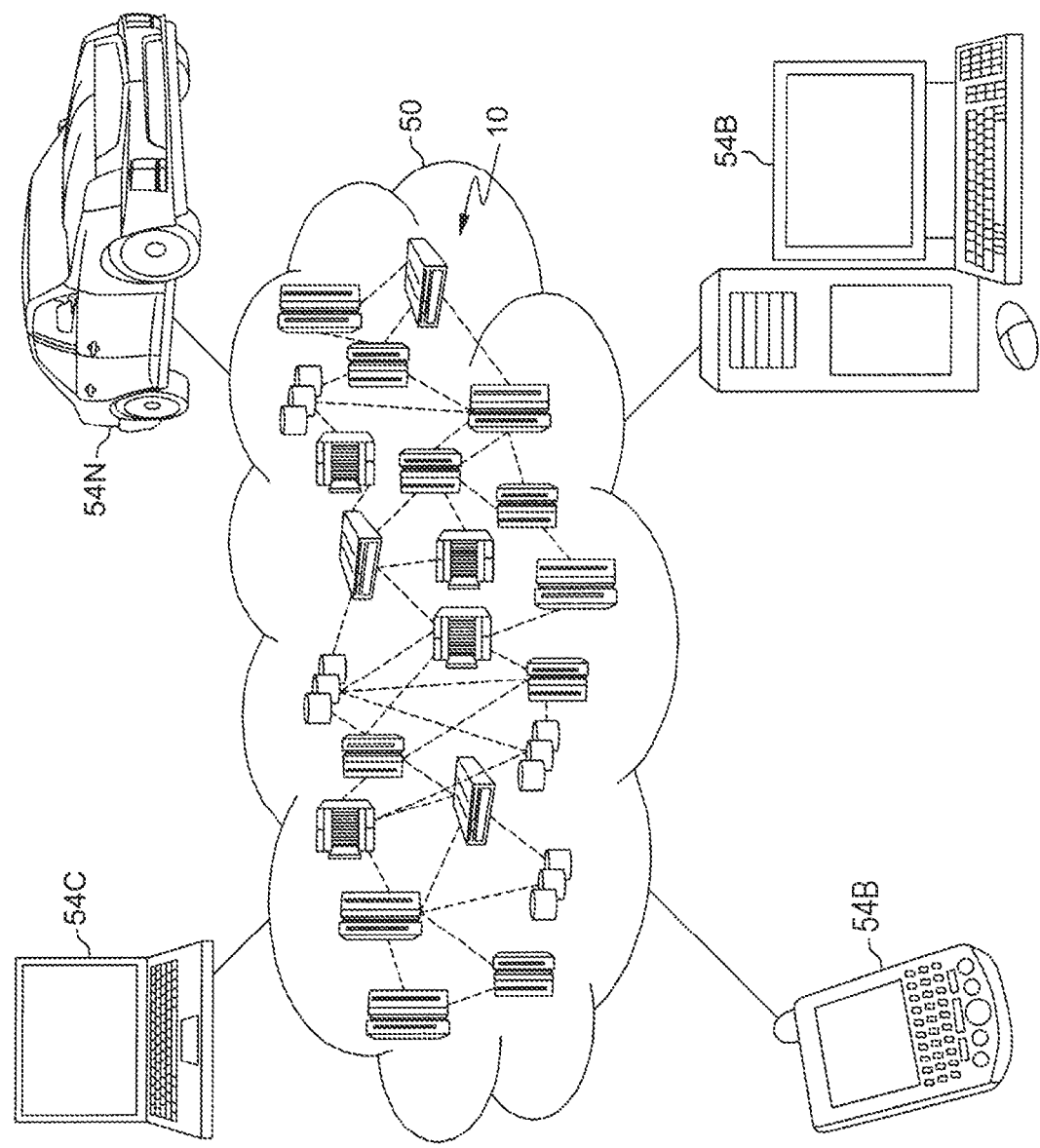
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
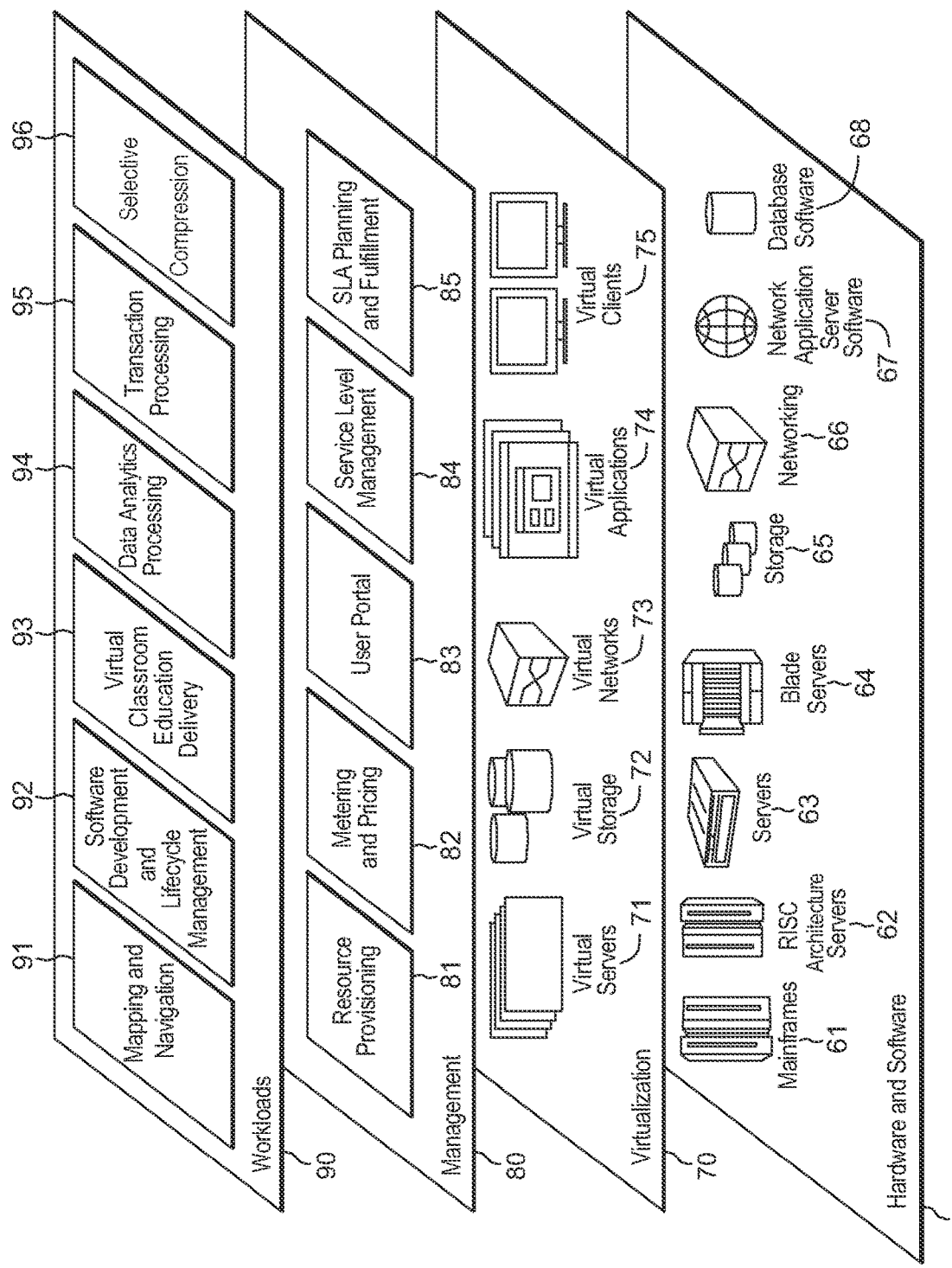
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective compression of packets in a 5G network 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
wirelessly receiving a congestion signal by user equipment (UE) wirelessly connected to a broadband cellular network, the congestion signal being received based on network traffic congestion in hardware of the broadband cellular network and indicating the network traffic congestion;
determining current processor utilization of the UE;
based on the received congestion signal, the determined current processor utilization, and known times for data compression and decompression, determining whether to automatically enable selective packet payload data compression on the UE, in which decisions whether to compress packet payload data transmitted between the UE and broadband cellular network are made on a per-channel basis for a plurality of logical channels over which the UE communicates with the broadband cellular network, wherein a decision, of the decisions, made for a respective logical channel of the plurality of logical channels is based on a quality requirement corresponding to an application communicating via the respective logical channel; and
based on determining to automatically enable selective packet payload data compression, compressing payload data of one or more data packets generated by the UE and forwarding the one or more data packets with the compressed payload data for transmission on the broadband cellular network.

2. The method of claim 1, wherein the broadband cellular network is a 5G New Radio network, wherein the UE is in direct wireless communication with a radio base station of the broadband cellular network, the radio base station comprising one selected from the group consisting of: a gNodeB device and a next-generation Evolved Node B (eNodeB) device, and wherein the network traffic congestion comprises congestion in at least one selected from the group consisting of: the radio base station and a physical network function (PNF) device of the broadband cellular network.

3. The method of claim 2, wherein the compressing is performed in a packet data convergence protocol (PDCP) layer of a User Plane stack of the UE.

4. The method of claim 3, wherein the PDCP layer performs compression of header data of the one or more packets regardless of whether the selective packet payload data compression is enabled or disabled.

5. The method of claim 1, wherein the determining whether to automatically enable selective packet payload data compression compares the current CPU utilization to a utilization threshold set for the UE, wherein the determining determines to enable selective packet payload data compression based on the current CPU utilization being below the utilization threshold, and wherein the method further comprises, based on subsequently determining that CPU utilization is at or above the utilization threshold, disabling selective packet payload data compression on the UE.

6. The method of claim 1, further comprising monitoring packet transmission latency over a wireless radio link between the UE and the broadband cellular network, wherein the determining whether to automatically enable selective packet payload data compression is based further on determining whether, in comparison to the packet transmission latency, selective packet payload data compression will result in a net decrease in time to transfer the payload data over the broadband cellular network.

7. The method of claim 6, wherein based on a sum of (i) a known time to compress the payload data, (ii) a known time to decompress the payload data, and (iii) a known time to transmit the payload data if compressed being less than the packet transmission latency, the determining whether to automatically enable selective packet payload data compression determines to enable selective packet payload data compression and compress the payload data.

8. The method of claim 1, wherein the one or more packets are for transmission on a particular dedicated logical channel that the UE has established with the broadband cellular network and that is associated with a quality-of-service class identifier (QCI), wherein the method further comprises checking whether compression is enabled for the dedicated logical channel, wherein whether compression is enabled for the dedicated logical channel is based on the QCI associated with the dedicated logical channel, and wherein the compressing is performed based on the checking indicating that compression is enabled for the dedicated logical channel.

9. The method of claim 1, further comprising receiving a compression disablement signal from a physical network function (PNF) device of the broadband cellular network and, based on receiving the compression disablement signal, disabling selective packet payload data compression on the UE.

10. The method of claim 1, further comprising indicating to other devices of the broadband cellular network that the payload of the data packet is compressed by, as part of the compressing, pinning a compression status indicator to each of the one or more data packets.

11. A computer system comprising:
a memory; and
a processor in communication with the memory, wherein the computer system is configured to perform a method comprising:
wirelessly receiving a congestion signal by user equipment (UE) wirelessly connected to a broadband cellular network, the congestion signal being received based on network traffic congestion in hardware of the broadband cellular network and indicating the network traffic congestion;
determining current processor utilization of the UE;
based on the received congestion signal, the determined current processor utilization, and known times for data compression and decompression, determining whether to automatically enable selective packet payload data compression on the UE, in which decisions whether to compress packet payload data transmitted between the UE and broadband cellular network are made on a per-channel basis for a plurality of logical channels over which the UE communicates with the broadband cellular network, wherein a decision, of the decisions, made for a respective logical channel of the plurality of logical channels is based on a quality requirement corresponding to an application communicating via the respective logical channel; and
based on determining to automatically enable selective packet payload data compression, compressing payload data of one or more data packets generated by the UE and forwarding the one or more data packets with the compressed payload data for transmission on the broadband cellular network.

12. The computer system of claim 11, wherein the broadband cellular network is a 5G New Radio network, wherein the UE is in direct wireless communication with a radio base station of the broadband cellular network, the radio base station comprising one selected from the group consisting of: a gNodeB device and a next-generation Evolved Node B (eNodeB) device, wherein the network traffic congestion comprises congestion in at least one selected from the group consisting of: the radio base station and a physical network function (PNF) device of the broadband cellular network, and wherein the compressing is performed in a packet data convergence protocol (PDCP) layer of a User Plane stack of the UE.

13. The computer system of claim 11, wherein the determining whether to automatically enable selective packet payload data compression compares the current CPU utilization to a utilization threshold set for the UE, wherein the determining determines to enable selective packet payload data compression based on the current CPU utilization being below the utilization threshold.

14. The computer system of claim 11, wherein the method further comprises monitoring packet transmission latency over a wireless radio link between the UE and the broadband cellular network, wherein the determining whether to automatically enable selective packet payload data compression is based further on determining whether, in comparison to the packet transmission latency, selective packet payload data compression will result in a net decrease in time to transfer the payload data over the broadband cellular network, wherein based on a sum of (i) a known time to compress the payload data, (ii) a known time to decompress the payload data, and (iii) a known time to transmit the payload data if compressed being less than the packet transmission latency, the determining whether to automatically enable selective packet payload data compression determines to enable selective packet payload data compression and compress the payload data.

15. The computer system of claim 11, wherein the one or more packets are for transmission on a particular dedicated logical channel that the UE has established with the broadband cellular network and that is associated with a quality-of-service class identifier (QCI), wherein the method further comprises checking whether compression is enabled for the dedicated logical channel, wherein whether compression is enabled for the dedicated logical channel is based on the QCI associated with the dedicated logical channel, and wherein the compressing is performed based on the checking indicating that compression is enabled for the dedicated logical channel.

16. A computer program product comprising:
a computer readable storage medium readable by a processing circuit and storing instructions for execution by the processing circuit for performing a method comprising:
wirelessly receiving a congestion signal by user equipment (UE) wirelessly connected to a broadband cellular network, the congestion signal being received based on network traffic congestion in hardware of the broadband cellular network and indicating the network traffic congestion;
determining current processor utilization of the UE;
based on the received congestion signal, the determined current processor utilization, and known times for data compression and decompression, determining whether to automatically enable selective packet payload data compression on the UE, in which decisions whether to compress packet payload data transmitted between the UE and broadband cellular network are made on a per-channel basis for a plurality of logical channels over which the UE communicates with the broadband cellular network, wherein a decision, of the decisions, made for a respective logical channel of the plurality of logical channels is based on a quality requirement corresponding to an application communicating via the respective logical channel; and based on determining to automatically enable selective packet payload data compression, compressing payload data of one or more data packets generated by the UE and forwarding the one or more data packets with the compressed payload data for transmission on the broadband cellular network.

17. The computer program product of claim 16, wherein the broadband cellular network is a 5G New Radio network, wherein the UE is in direct wireless communication with a radio base station of the broadband cellular network, the radio base station comprising one selected from the group consisting of: a gNodeB device and a next-generation Evolved Node B (eNodeB) device, wherein the network traffic congestion comprises congestion in at least one selected from the group consisting of: the radio base station and a physical network function (PNF) device of the broadband cellular network, and wherein the compressing is performed in a packet data convergence protocol (PDCP) layer of a User Plane stack of the UE.

18. The computer program product of claim 16, wherein the determining whether to automatically enable selective packet payload data compression compares the current CPU utilization to a utilization threshold set for the UE, wherein the determining determines to enable selective packet payload data compression based on the current CPU utilization being below the utilization threshold.

19. The computer program product of claim 16, wherein the one or more packets are for transmission on a particular dedicated logical channel that the UE has established with the broadband cellular network and that is associated with a quality-of-service class identifier (QCI), wherein the method further comprises checking whether compression is enabled for the dedicated logical channel, wherein whether compression is enabled for the dedicated logical channel is based on the QCI associated with the dedicated logical channel, and wherein the compressing is performed based on the checking indicating that compression is enabled for the dedicated logical channel.

20. The method of claim 1, wherein the plurality of logical channels corresponds to a plurality of applications executing on the UE.

* * * * *